United States Patent [19]

Johnson

[11] 4,002,348

[45] Jan. 11, 1977

[54] SAFETY RELEASE DEVICE USEFUL IN TAPPING ATTACHMENTS

[75] Inventor: Allan S. Johnson, Newport Beach, Calif.

[73] Assignee: Tapmatic Corporation, Irvine, Calif.

[22] Filed: May 7, 1975

[21] Appl. No.: 575,359

[52] U.S. Cl. .................................. 279/75; 279/1 B; 279/81

[51] Int. Cl.² .......................................... B23B 5/22

[58] Field of Search ................. 279/1 B, 22, 71, 75, 279/81

[56] References Cited

UNITED STATES PATENTS

| | | | |
|---|---|---|---|
| 2,475,861 | 7/1949 | Thalmann | 279/71 |
| 2,603,496 | 7/1952 | Richert | 279/71 |
| 2,835,497 | 5/1950 | Suhner | 279/75 X |
| 2,926,020 | 2/1960 | Dayton et al. | 279/75 |
| 2,960,343 | 11/1960 | Elledge | 279/1 B |
| 3,523,693 | 8/1970 | Sykes | 279/71 X |

*Primary Examiner*—Leon Gilden
*Attorney, Agent, or Firm*—Herzig & Walsh, Inc.

[57] ABSTRACT

A releasable detent joint or coupling between telescoping cylindrical parts such as a receptacle and a tool holder held therein. The inner member is held by ball detents and a holding ring. The ring is expandable to allow release of the ball detents and separation of the parts in response to a predetermined applied torque to provide a safety release. In a simplified form of the invention, the holding ring is not expandable but release is effected merely by angular movement of the ring to a release position of the ball detents.

3 Claims, 13 Drawing Figures

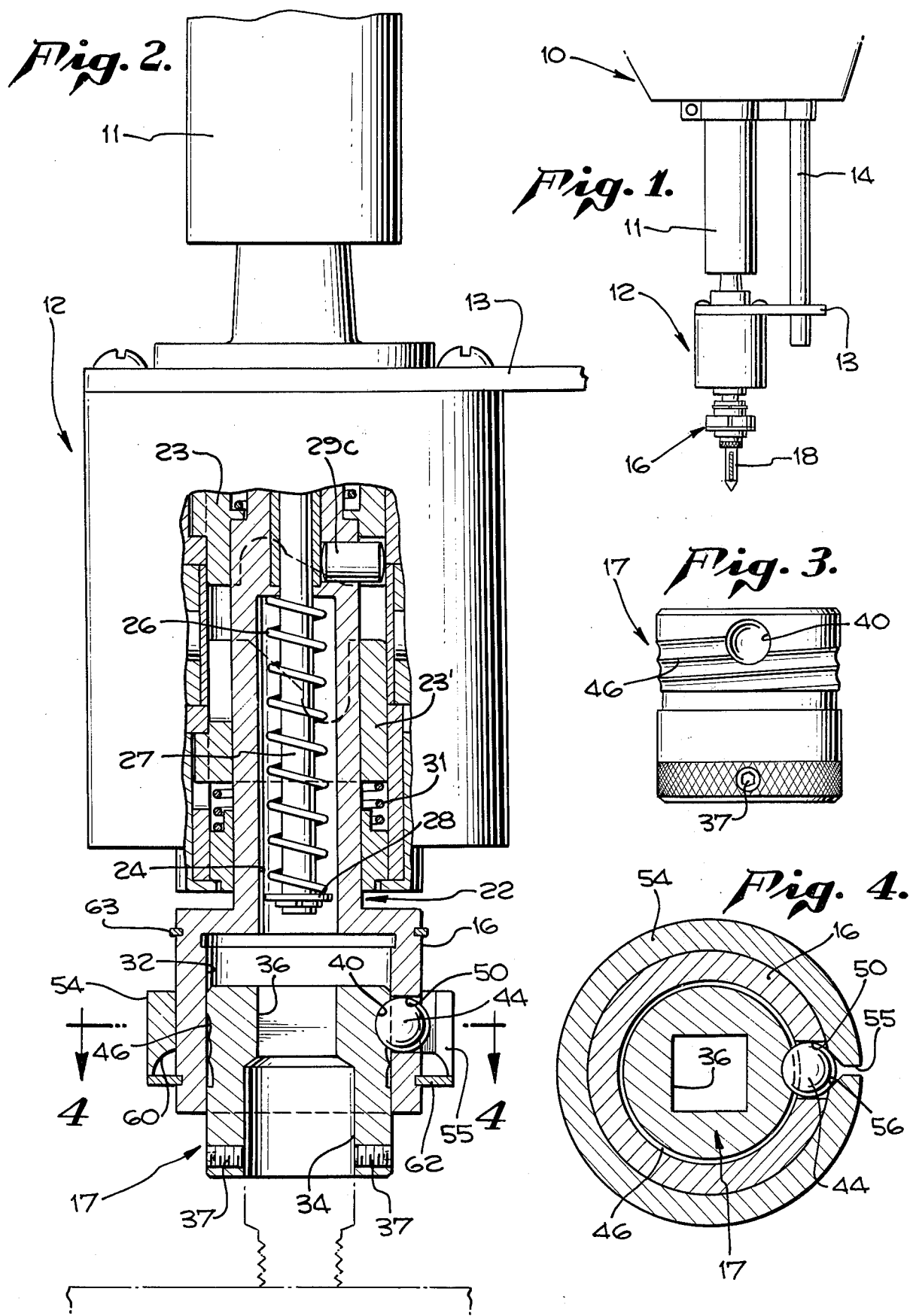

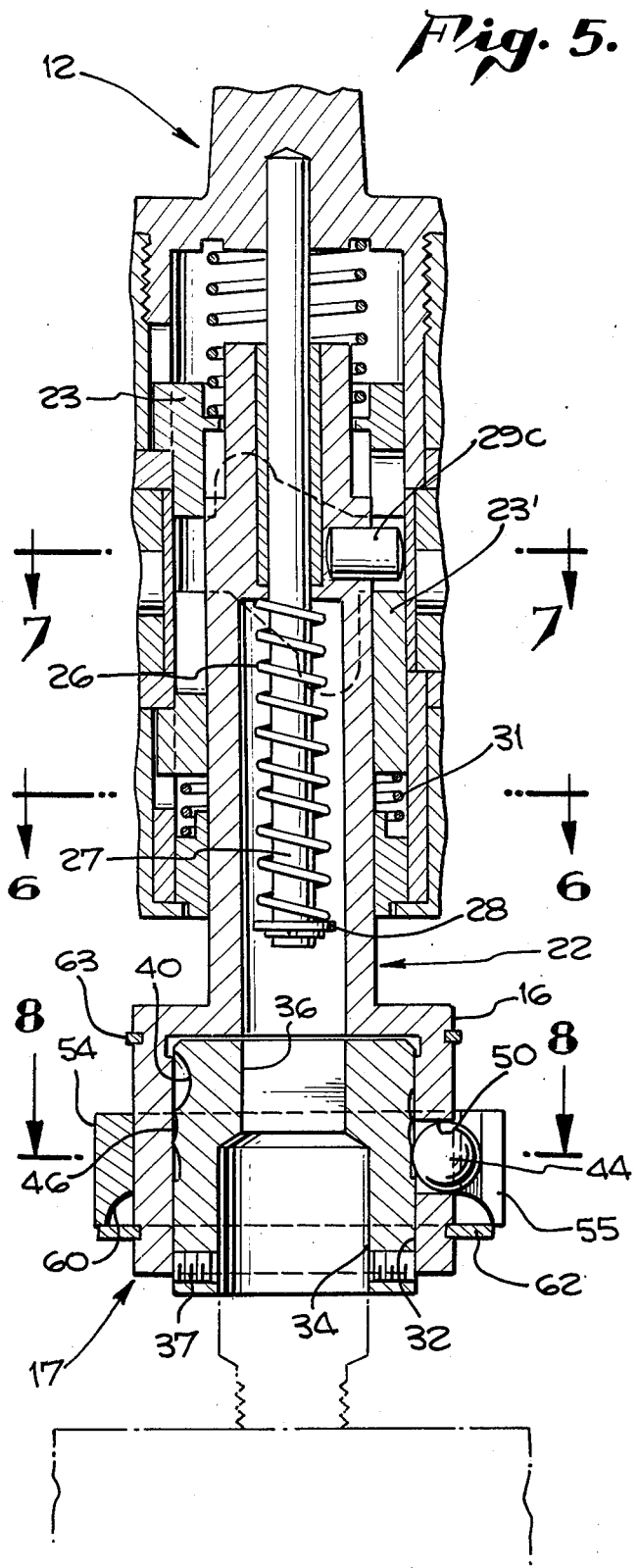
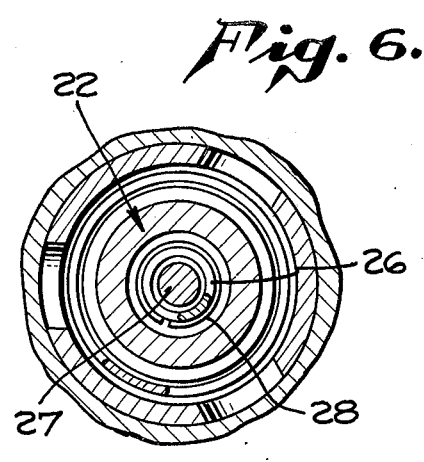
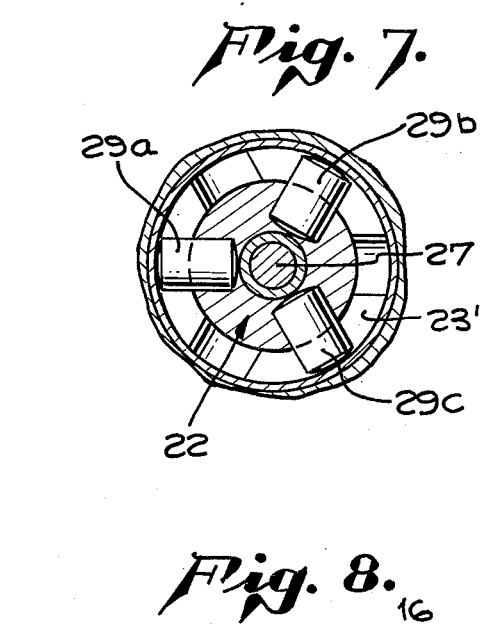
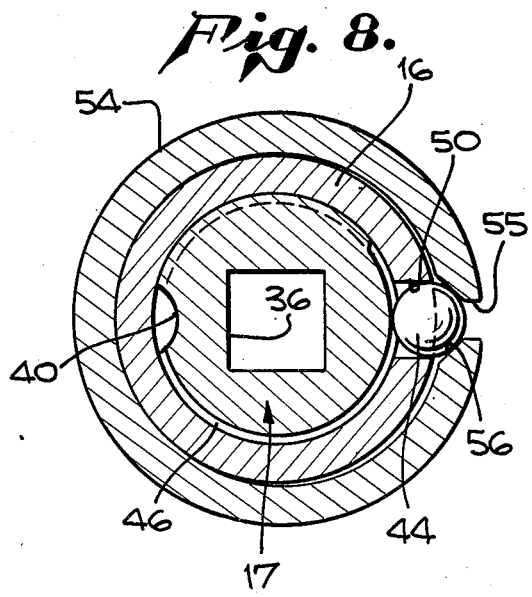

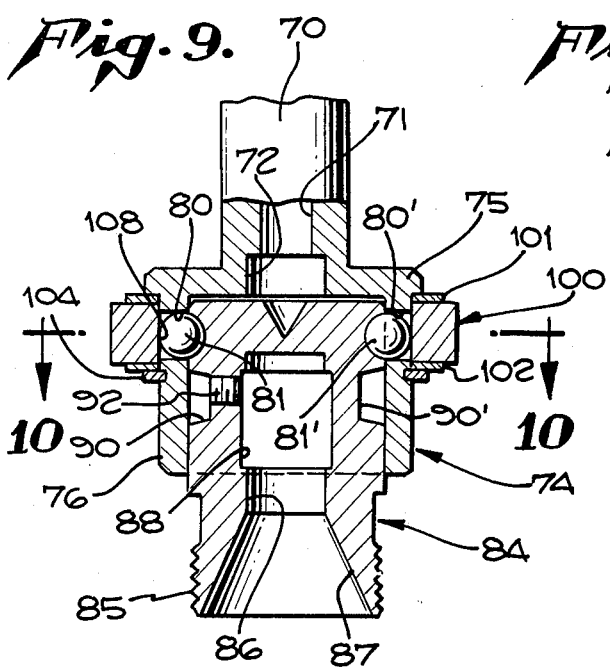
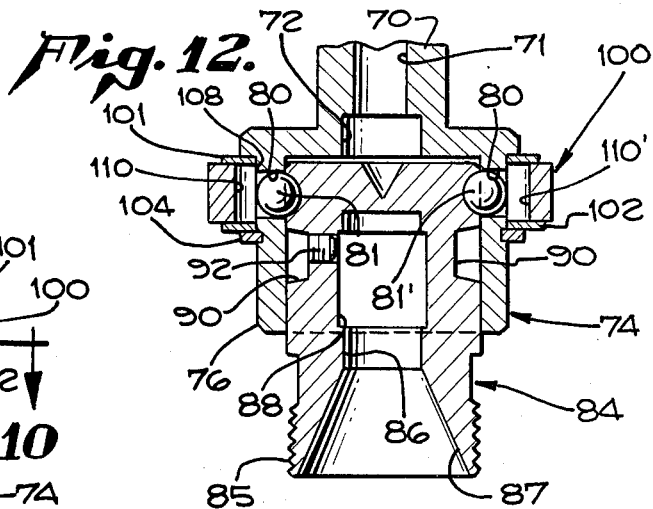
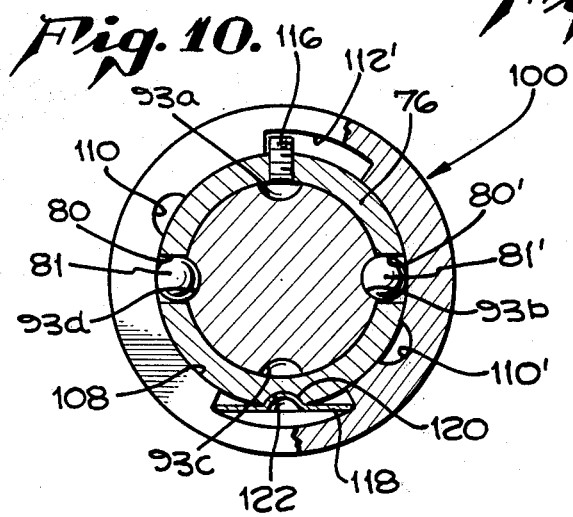
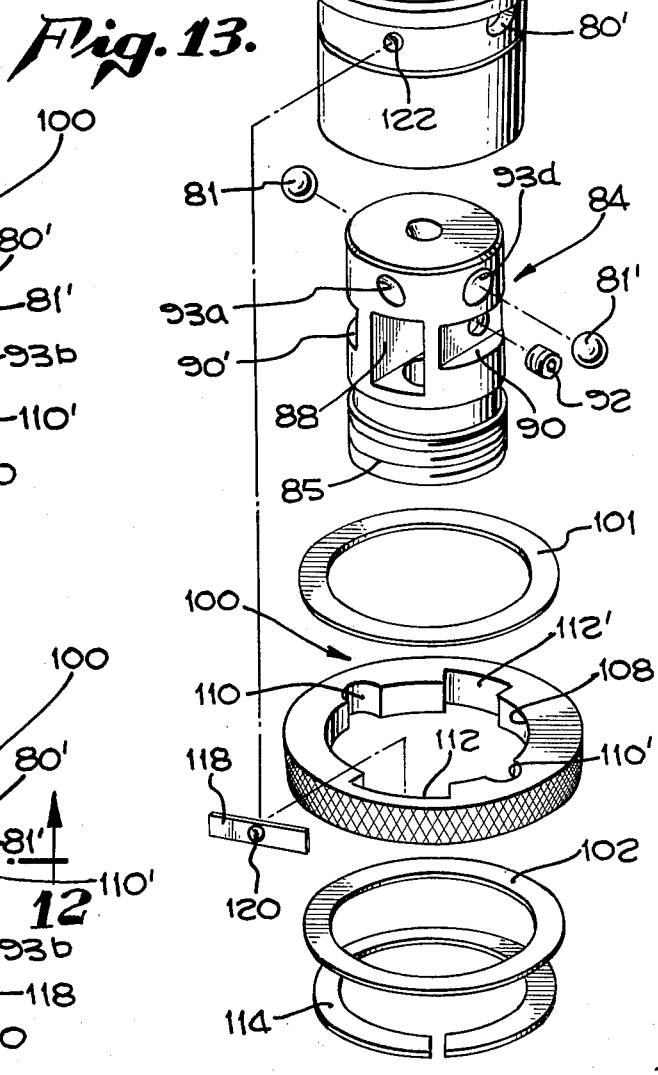
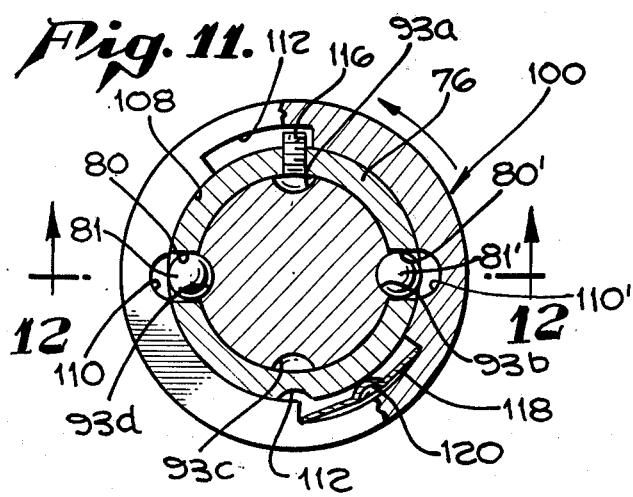

SAFETY RELEASE DEVICE USEFUL IN TAPPING ATTACHMENTS

BACKGROUND OF THE INVENTION

1. Field of the Invention

The field of the invention in its most basic form is that of releasable joints or couplings between any telescoping cylindrical members which may be, for example, a receptacle and a cylindrical tool holder held in the receptacle. In another form of the invention the joint between the parts is automatically releasable in response to an applied torque as between the parts to provide a safety release. This form of the invention is highly adaptable for use in association with tapping equipment and attachments described in detail hereinafter.

2. Description of the Prior Art

The prior art presently available is that wherein a releasable joint or connection has been provided as between a tool holder and a receptacle on the stem of a spindle of a tapping attachment. The tapping attachments having a spindle with the receptacle for receiving a tool holder are exemplified in U.S. Pat. No. 3,791,756. This patent does not teach the simplified form of manually releasable joint or coupling described in detail herein, or the joint or coupling which is releasable in response to application of torque.

SUMMARY OF THE INVENTION

In a basic primary form of the invention there are telescoping cylindrical parts which by way of example are in the form of a cylindrical receptacle and a cylindrical tool holder. The receptacle has radial openings receiving detent balls which fit into semi-spherical recesses in the tool holder. The detent balls are held in position by an angularly movable ring having oppositely disposed semi-spherical recesses into which the detent balls can be released for uncoupling or separating the parts. This simplified manually actuatable joint or coupling has many useful applications as described hereinafter. It is adaptable for use between any telescoping cylindrical parts.

In another form of the invention, it is particularly or specially adapted for utilization in apparatus such as a reversible tapping attachment wherein a tool holder is received in a receptacle. In this form of the invention the holding ring is split so that it can be expanded automatically in response to torque which is applied to a detent ball providing for automatic release. In this form of the invention there are further improvements in that the tool holder is provided with a helical groove so that in the event of an overload stopping the tool holder, the detent ball will release and then as the receptacle continues to rotate the ball will follow a helical groove until the direct drive clutch of the tapping attachment releases stopping the direct drive. Then upon linear retraction of the attachment by the machine, which causes the reverse drive to engage, the spindle will be driven in the opposite direction and the ball will follow the groove in the opposite direction back into the original detent position.

The primary object is to provide a simplified but extremely effective releasable joint or coupling adapted for use between telescoping cylindrical members.

A further object is to provide a joint as in the foregoing object wherein one or more detent balls are received in radial openings in the outer member and fit into recesses in the inner member, there being an angularly movable ring around the balls operable to restrain them in holding position or to release them.

A further object is to provide a joint or coupling means as described, adaptable for use such as between a receptacle and a tool holder wherein the ring is split so as to be expandable in response to torque applied to a detent ball for releasing, thus providing a safety overload release mechanism.

A further object is to provide a joint or coupling as in the foregoing objects wherein the inner member, in the form of a tool holder, has a helical groove which can be followed by the detent ball upon release, thereby causing the outer cylindrical receptacle member to move axially to produce declutching in a tapping attachment followed by clutching into reverse drive whereby the ball can retrace its path along the helical groove back into the original holding position.

Further objects and additional advantages of the invention will become apparent from the following detailed description and the annexed drawings.

BRIEF DESCRIPTION OF THE DRAWINGS

FIG. 1 is a view of an examplary form of tapping attachment as mounted on a machine;

FIG. 2 is a view showing the tapping attachmend and the receptacle on the spindle with the tool holder held by the coupling means of the invention;

FIG. 3 is a detail view of the tool holder of FIG. 2;

FIG. 4 is a sectional view taken along the line 4—4 of FIG. 2;

FIG. 5 is a view similar to that of FIG. 2 showing the parts in another position;

FIGS. 6, 7, and 8 are cross-sectional views respectively along the lines 6—6; 7—7; 8—8 of FIG. 5.

FIG. 9 is a cross-sectional view of a modified form of the invention;

FIG. 10 is a sectional view taken along line 10—10 of FIG. 9;

FIG. 11 is a view similar to that of FIG. 10 with the parts in a different relative position;

FIG. 12 is a sectional view taken along the line 12—12 of FIG. 11;

FIG. 13 is an exploded view of the form of the invention shown in FIGS. 9–12.

DESCRIPTION OF THE PREFERRED EMBODIMENT

Referring now more in detail to the drawings, numeral 18 designates a machine tool with an arbor 11 which is carrying a tapping attachment designated at 12. Numeral 13 is a radial holding arm which engages the stop rod or column 14 which holds the body of the attachment against rotation and is conventional in the prior art. Numeral 16 designates a receptacle for receiving a tool holder 17 in which a bit 18 can be carried, as will be described.

The tapping attachment 12 is of a known type and therefore need not be described in full detail. It may be like that of U.S. Pat. No. 3,717,892 except for details as pointed out herein, and such patent is hereby incorporated herein by reference. The attachment has a spindle as designated at 22 having a bore 24. It is normally biased in an upward direction by a coil spring 26 surrounding a stem 27 having a spring retaining holding washer 28 at its lower end.

The biasing means for the spindle as described may be like that of U.S. Pat. No. 3,041,893, also incorporated herein by reference.

The spindle 22 is driven by way of drive pins 29a, b, and c and may be driven in either direction as disclosed in U.S. Pat. No. 3,717,892. The direct drive is by way of direct drive spring driver cup 23 biased by spring 25 and reverse drive is by way of spring driver cup 23' biased by spring 31.

The receptacle 16 has a bore 32 which receives the tool holder 17 as shown in detail in FIG. 3. The tool holder has a circular bore 34 and a square bore 36 shaped to receive the shank of the tapping bit. The bit is held by set screws as shown at 37 and 37'.

In the side of the tool holder 17 at the top is a recess 40 which is part of a sphere, and in which can be seated a detent ball 44 as shown. Numeral 46 designates a relatively shallow helical groove starting at the depression or recess 40 and traversing around the tool holder 17 downwardly as shown, for a purpose as will be described presently.

In the side of the skirt of the receptacle 16 there is a radial hole or aperture 50 in which the detent ball 44 is carried. Surrounding the receptacle 16 is a manually movable holding ring 54 which is split as designated at 55, the ring being expandable as will be described. At the inside of the split 55 the ends of the ring 54 are tapered as designated at 56, the ball 44 engaging against the tapers or bevels. At the bottom part of the ring 54 there is an annular groove or cutout 60 which has a quadrant shape. The ring 54 normally rests on the ring 62 fitted into a groove in the side of the skirt of receptacle 16 forming a flange as shown. Ring 54 can be manually moved upwardly to a stop ring 63 fitted into a groove in the upper part of the receptacle 16.

The tool holder 17 can readily be uncoupled or separated from the receptacle 16 manually, simply by moving the ring 54 upwardly and against the stop ring 63. This brings the quadrant annular groove 60 opposite the ball 44 allowing it to move outwardly radially from the recess 40 in the tool holder 17 to release the tool holder. This provides a substantial convenience since it makes it easy to substitute other tool holders having different size bores adapted for different bits.

The mechanism as described has additional capabilities as will now be explicated. The device provides a safety overload torque release device. In the event the bit 18 should jam in the tapped hole or otherwise give rise to an overload while the attachment is still turning the receptacle 16, the applied torque would become sufficient so that the ball 44 is forced outwardly and against the split ring 54 to expand it, allowing the ball to move out of the recess 40. The spindle still being turned, the ball now traverses the helical groove 46 until the parts come into a position as shown in FIG. 5. In this position, as will be seen, the spindle 22 and receptacle 16 have been moved axially downwardly. This movement is enough so that the spindle drive pins 29a, b, and c disengage from the upper direct drive collar 23. The machine 10 has moved the attachment linearly downwardly against a stop and now linearly moves the attachment 12 upwardly relative to the spindle 22. Accordingly, the reverse drive collar 27 is moved upwardly into clutching engagement with the radial drive pins 29 and the spindle 22 is now rotated in the reverse direction. The ball 44 now traverses the helical groove 46 in the opposite direction until the ball has returned into a detenting position in the recess 40, that is, into the position of FIG. 2.

The mechanism as just described is particularly adaptable for use with attachments of relatively large size for heavy operations where there is relatively a large amount of torque, that is, high power, to turn the tapping bit in the tapped hole.

FIGS. 9-13 illustrate a simplified form of the invention. This form of the invention is adapted for joining or coupling together any telescoping cylindrical parts. As illustrated, however, the invention is shown adapted to a tapping spindle having a receptacle and a tool holder. Numeral 70 designates the lower end of a tapping spindle having a bore 71 and counter bore 72. It has receptacle 74. The receptacle has an upper part 75 of larger diameter and a skirt 76 of smaller diameter. In opposite sides of the skirt 76 are radial holes 80 and 80' receiving detent balls 81 and 81'.

The tool holder is designated generally at 84. Its lower end is threaded as shown at 85. It has a circular bore 86 and tapered counter bore 87. Numeral 88 designates a transverse slot for receiving jaws for holding a tapping bit. In the sides of the tool holder are cutouts as designated at 90 and 90', one of them having a bore receiving a set screw 92. See FIG. 13. In the sides of the tool holder near the top are four partial recesses spaced 90° apart, as designated at 93a, b, c, and d. See FIG. 10. The detent balls 81 and 81' are received in oppositely disposed of the recesses in the tool holder 84.

Numeral 100 designates an angularly movable locking ring, the outside surface of which is knurled. It fits around the skirt 76 of the receptacle 74 adjacent to the positions of the holes 80 and 80' and the detent balls 81 and 81'. The ring 100 is held in position by upper and lower rings 101 and 102 fitting around the skirt 76, the assembly of rings resting on a further ring 104 that fits into a slot in the skirt 76.

The internal configuration of the ring 100 can best be seen in the exploded view FIG. 13. Numeral 108 designates the inner surface of the ring. Formed in this inner surface are oppositely disposed semi-circular depressions 110 and 110' into which the detent balls 81 and 81' can move as illustrated in FIGS. 11 and 12. Formed on the inside of the ring 100 oppositely to each other and spaced 90° from the recesses 110 and 110' are cutouts 112 and 112' the bottom surfaces of which are arcuate and parallel to the outside of the ring 100 and the ends of which are radial. Numeral 116 designates a screw extending radially through the skirt 76 into the cutout 112'. The ring 100 is movable angularly between stop positions determined by the screw 116 extending into the cutout 112'. In the other cutout 112 is a spring plate 118 having a boss 120 formed in it having a round configuration which cooperates with a recess of similar configuration identified by the numeral 122 in the outside of the side of the skirt 76. The spring member 118 serves as a detent to determine a positive positional relationship between the ring 100 and the skirt 76, as illustrated in FIG. 10.

The operation of the coupling device will be readily understood from FIGS. 9-13. In FIGS. 9 and 10 the receptacle and tool holder are locked together against axial movement, the detent balls 81 and 81' being in positions as shown, with the screw 116 at one end of the cutout 112'. The boss 120 in detent plate 118 is in recess 122. FIG. 11 shows the ring 100 rotated angularly in a counter-clockwise direction so that screw 116 is at the opposite end of cutout 112'. The recess 110 and 110' in ring 110 are now opposite the positions of detent balls 81 and 81'. In this position the balls can move outwardly into the recesses 110 and 110' so that the skirt 76 of receptacle 74 is disengaged from the tool holder 84 which can be moved axially relatively. The cross-sectional views 11 and 12 illustrate the positions of the parts.

From the foregoing, it is seen that the device forms a joint or coupling between the telescoping parts whereby they can be locked together against relative axial movement so they can be released merely by rotation of the locking ring 100 angularly.

From the foregoing, those skilled in the art will readily understand the nature of the construction of the invention, its operation, and the manner in which all of the objects as set forth in the foregoing are realized.

The foregoing disclosure is representative of the preferred forms of the invention and is to be interpreted in an illustrative rather than a limiting sense. The invention to be accorded the full scope of the claims appended hereto. It is intended that the claims cover a reasonable range of equivalents including, among other things, reversals of parts, such as having the detent balls carried by the inner member with the locking ring or member on the inside.

I claim:

1. As an article of manufacture, an apparatus for providing a releasable joint between telescoping cylindrical members comprising an inner member and an outer member, radially movable means carried by the outer member, and the inner member having means constructed to be engageable by said radially movable means in a manner to prevent relative axial movement of the inner and outer members, and relatively movable actuator means carried by the outer member and having means positionable in a manner to allow the said radially movable means to move outward radially to disengage from the said inner member whereby to allow for relative axial movement as between the inner and outer members, wherein said actuator means is deformable sufficiently whereby in response to predetermined torque load, said radially movable member can be moved radially sufficiently to disengage from the inner member, wherein the said actuator means is in the form of a split ring, wherein said inner member has a recess having the shape of a part of a sphere, said radially movable means being a ball, said inner member having a helical groove in it, said recess being at one end of the said groove whereby upon stoppage of rotation of the inner member while the outer member continues to rotate, said radially movable ball can follow said helical groove, causing the outer member to move axially relative to the inner member.

2. An apparatus as in claim 1 wherein said inner and outer members are constructed for relative rotation in either direction whereby when the outer member rotates relatively to the inner member in the opposite direction, said ball traverses the helical groove in the opposite direction and back to the position of the said recess.

3. An apparatus as in claim 1 wherein the said outer member is carried by the spindle of a reversing tapping attachment having clutching means for direct drive and reverse drive of the spindle, the attachment being operable to shift from direct drive to reverse drive in response to relative axial movement of the spindle whereby upon traversal of the said helical groove by the ball member, the spindle is moved axially in a manner to shift from direct drive to reverse drive.

* * * * *